US011000991B2

(12) United States Patent
Lu et al.

(10) Patent No.: US 11,000,991 B2
(45) Date of Patent: May 11, 2021

(54) SYSTEMS AND METHOD FOR FOUR-DIMENSIONAL PRINTING OF ELASTOMER-DERIVED CERAMIC STRUCTURES BY COMPRESSIVE BUCKLING-INDUCED METHOD

(71) Applicant: City University of Hong Kong, Kowloon (HK)

(72) Inventors: Jian Lu, Kowloon (HK); Guo Liu, Kowloon (HK); Yan Zhao, Kowloon (HK)

(73) Assignee: City University of Hong Kong, Kowloon (HK)

( * ) Notice: Subject to any disclaimer, the term of this patent is extended or adjusted under 35 U.S.C. 154(b) by 209 days.

(21) Appl. No.: 16/008,279

(22) Filed: Jun. 14, 2018

(65) Prior Publication Data

US 2019/0381725 A1 Dec. 19, 2019

(51) Int. Cl.
*B29C 64/124* (2017.01)
*B29C 61/08* (2006.01)
*B29C 64/295* (2017.01)
*B29C 64/112* (2017.01)
*B29C 64/209* (2017.01)
*B33Y 10/00* (2015.01)

(52) U.S. Cl.
CPC ............ *B29C 64/124* (2017.08); *B29C 61/08* (2013.01); *B29C 64/112* (2017.08); *B29C 64/209* (2017.08); *B29C 64/295* (2017.08); *B33Y 10/00* (2014.12)

(58) Field of Classification Search
None
See application file for complete search history.

(56) References Cited

U.S. PATENT DOCUMENTS

| 2016/0136877 A1* | 5/2016 | Rogers | B29C 61/0616 428/174 |
| 2017/0252974 A1* | 9/2017 | Ng | B33Y 30/00 |
| 2018/0148379 A1* | 5/2018 | Schaedler | C09D 5/004 |

OTHER PUBLICATIONS

Liu et al., Origami and 4D printing of elastomer-derived ceramic structures, Science Advances, 4 (8), 10.1126/sciadv.aat0641 (Year: 2018).*

* cited by examiner

*Primary Examiner* — Matthew J Daniels
*Assistant Examiner* — Paul Spiel
(74) *Attorney, Agent, or Firm* — Renner Kenner Greive Bobak Taylor & Weber

(57) ABSTRACT

Systems and method of constructing a 4D-printed ceramic object, the method including extruding inks including particles and polymeric ceramic precursors through a nozzle to deposit the inks to form a first elastic structure and a second elastic structure, subjecting the first elastic structure to a tensile stress along at least one axis, attaching the second elastic structure to the first elastic structure, releasing the application of the tensile stress from the first elastic structure to allow the first elastic structure and second elastic structure to form a 4D-printed elastomeric object, and converting the 4D-printed elastomeric object into the 4D-printed ceramic object.

17 Claims, 16 Drawing Sheets

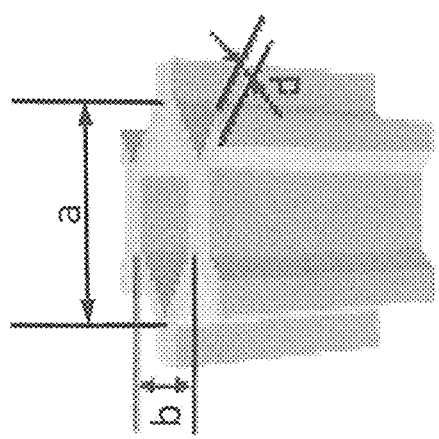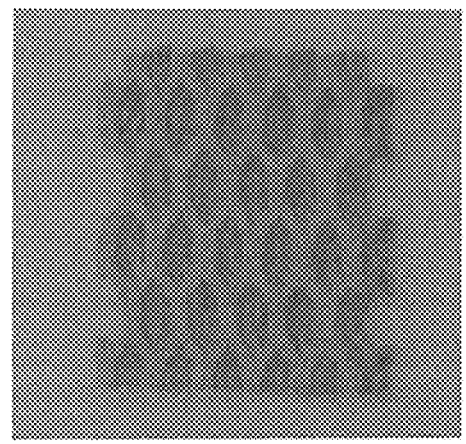
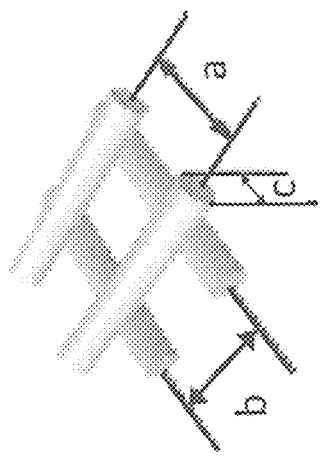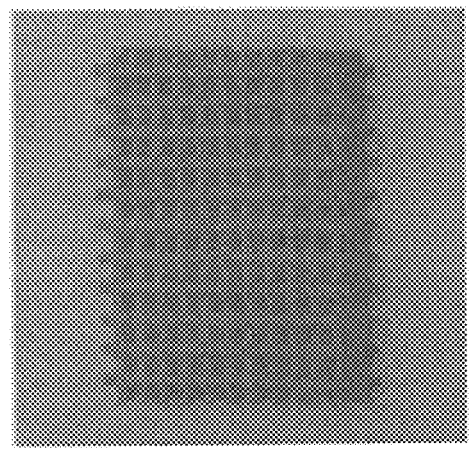
Figure 13A
Figure 13B

SYSTEMS AND METHOD FOR FOUR-DIMENSIONAL PRINTING OF ELASTOMER-DERIVED CERAMIC STRUCTURES BY COMPRESSIVE BUCKLING-INDUCED METHOD

FIELD OF INVENTION

The present invention relates to the fabrication of ceramic structures. In particular, embodiments of the invention are directed to the printing of ceramic structures using elastomer-derived compounds. Particular embodiments of the ceramic structures are printed in a manner such that the shape of the structure is morphed by subjecting the structure to mechanical forces, temperature variation and chemical processing.

BACKGROUND

In the present specification, it will be understood that the term "origami" refers to the process of folding thin sheets into Three-Dimensional (3D) objects. In the context of manufacturing and 3D printing, reference to "origami" assembly, is reference to the process of causing a 3D-printed object to "fold" or morph into a more complex shape.

Such folding may occur through the application of capillary force, by use of a mechanical inductor, or frontal photopolymerization, or by a shape memory mechanism inherent to the material from which the 3D-printed object is formed.

In colloquial language, 4D printed objects (i.e. objects that are able to move or transform over time by virtue of their inherent construction and/or use of materials) are generally fabricated by a process known as Four-Dimensional (4D) printing. Thus, in the context of the present specification, it will be understood that any reference to a "4D printed object" is a reference to an object that has been printed using a 3D printing technology, but that is able to transform over time due to inherent properties of the object. Correspondingly, 4D printing refers to a printing process whereby a 3D printing mechanism or methodology is employed, and in some instances, followed by a shape-morphing step, in a manner such that a 4D-printed object is produced.

As will be appreciated, 4D-printed objects and 4D printing technology may find application in a number fields including robotics, life science applications, and biomimetic 4D printing.

Polymer-Derived Ceramics (PDCs) are a type of ceramic, which are prepared through thermolysis and chemical treatment of polymeric ceramic precursors. PDCs exhibit remarkable properties of conventional ceramics such as high thermal stability, chemical resistance to oxidation and corrosion, in addition to mechanical resistance to tribology. The microstructures and properties of PDCs can be tuned through tailored polymer systems and thermolysis conditions.

The additive manufacturing of ceramic precursors is a state-of-the-art technology used to construct complicated ceramic architectures. However, existing ceramic precursors are not flexible and sufficiently stretchable to enable self-shaping assembly prior to polymer-to-ceramic transformation.

It is against this background that the present invention has been developed.

SUMMARY OF THE INVENTION

In one aspect, the present invention is directed to a method of constructing a 4D-printed ceramic object, the method comprising the steps of: extruding inks including particles and polymeric ceramic precursors through a nozzle to deposit the inks to form a first elastic structure and a second elastic structure, subjecting the first elastic structure to a tensile stress along at least one axis, attaching the second elastic structure to the first elastic structure, releasing the application of the tensile stress from the first elastic structure to allow the first elastic structure and second elastic structure to form a 4D-printed elastomeric object, and converting the 4D-printed elastomeric object into the 4D-printed ceramic object.

In one embodiment, the second elastic structure includes at least one area of lower bending stiffness or uniform bending stiffness.

The release of the first elastic structure from the tensile stress further includes the generation of a relative compressive stress to the second elastic structure which deforms the second elastic structure.

In one embodiment, the one or more of areas of reduced bending stiffness are arranged in a buckling pattern.

The buckling pattern is arranged in a Miura-ori pattern.

The first elastic structure is a planar substrate.

In one embodiment, the tensile stress is provided by attaching the first elastic structure to a stretching means.

The stretching means is a biaxial stretching device.

In one embodiment, at least one of the first elastic structure and the second elastic structure have a stretch ratio of 3.

In one embodiment, the particles are zirconium dioxide nanoparticles.

In one embodiment, the polymeric ceramic precursors are polysiloxanes.

In one embodiment, the polysiloxanes is poly(dimethylsiloxane).

In one embodiment, the inks are formed from a homogenous distribution of the particles in the polymeric ceramic precursors and wherein the weight percentage of the particles in the inks is in the range of from about 1% to about 90% and the weight percentage of the polymeric ceramic precursors in the inks is in the range of from about 10% to about 99%.

In one embodiment, the converting the 4D-printed elastomeric object into the 4D-printed ceramic object further includes heat treatment the 4D-printed elastomeric object in a vacuum or under an inert atmosphere.

In one embodiment, the inert atmosphere includes argon.

In one embodiment, the heating treatment occurs in a temperature range of 400° C. to 2000° C.

In one embodiment, the converting the 4D-printed elastomeric object into the 4D-printed ceramic object further includes subjecting the 4D-printed elastomeric object to further heat treatment in air after heat treatment in a vacuum or under an inert atmosphere.

In one aspect, the present invention is directed to a system for constructing a 4D-printed ceramic object comprising: extruding inks including particles and polymeric ceramic precursors through a nozzle to deposit the inks to form a first elastic structure and a second elastic structure, subjecting the first elastic structure to a tensile stress along at least one axis, attaching the second elastic structure to the first elastic structure, releasing the application of tensile stress from the first elastic structure to allow the first elastic structure and second elastic structure to form a 4D-printed elastomeric object, and converting the 4D-printed elastomeric object into the 4D-printed ceramic object.

BRIEF DESCRIPTION OF THE DRAWINGS

Notwithstanding any other forms which may fall within the scope of the present invention, a preferred embodiment will now be described, by way of example only, with reference to the accompanying drawings in which:

FIG. 13A, FIG. 13B, FIG. 13C, FIG. 13D and FIG. 13E are illustrations of example geometric representations of the associated entries in Table 1.

DETAILED DESCRIPTION OF PREFERRED EMBODIMENTS

Figure 1:
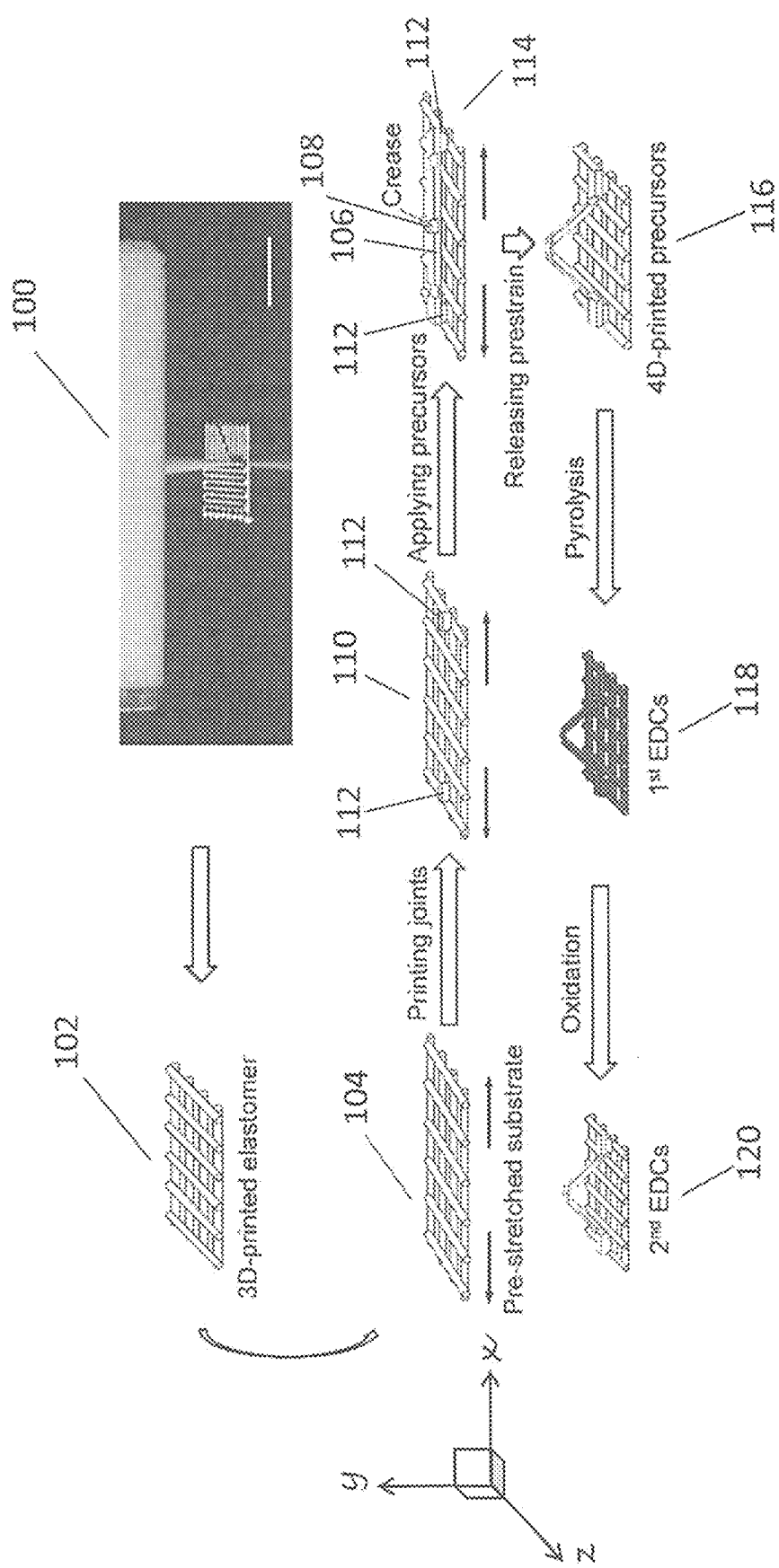
FIG. 1 illustrates the compressive buckling-induced origami method in accordance with an embodiment of the invention.

In the ensuing description, certain terms, once introduced, will be abbreviated for the sake of brevity and to improve readability. It will be understood that the use of such abbreviations should not be construed as being limiting or otherwise placing a "gloss" on the meanings of such terms beyond the meanings that would be placed on the terms when construed by a skilled addressee.

Broadly, one of the inventive aspects is directed to a method of constructing a 4D-printed ceramic object, the method comprising the following steps. Firstly, extruding inks including particles and polymeric ceramic precursors through a nozzle to deposit the inks to form a first elastic structure and a second elastic structure. The first elastic structure is subjected to a tensile stress along at least one axis. The second elastic structure is attached to the first elastic structure, after which the tensile stress applied to the first elastic structure is released to allow the first elastic structure and second elastic structure to form a 4D-printed elastomeric object. The 4D-printed elastomeric object is converted into the 4D-printed ceramic object.

In another aspect, the invention is directed to a system for constructing a 4D-printed ceramic object comprising: extruding inks including particles and polymeric ceramic precursors through a nozzle to deposit the inks to form a first elastic structure and a second elastic structure, subjecting the first elastic structure to tensile stress along at least one axis, attaching the second elastic structure to the first elastic structure, releasing the application of tensile stress from the first elastic structure to allow the first elastic structure and second elastic structure to form a 4D-printed elastomeric object, and converting the 4D-printed elastomeric object into the 4D-printed ceramic object.

Specific embodiments will now be described in more detail with reference to the drawings. In an embodiment, a known and cost efficient 4D printing method is used to form the 4D ceramic structure. One such method may include Direct Ink Writing (DIW) to form a first elastic structure and a second elastic structure from the ceramic precursor. However, other forms of additive manufacturing techniques such as fused filament fabrication (FFF), Rapid Liquid Printing (RLP), Aerosol Jet, and Fluidic force microscopy (FluidFM) techniques may also be used to form the 4D ceramic structure as would be understood by the person skilled in the art.

Polydimethylsiloxane (PDMS) is a dominant elastomer in silicone systems and is useful as a ceramic precursor, while providing inherent flexibility to construct a material that is suitable for subjecting to tensile stress without the material experiencing plastic deformation. Furthermore, the stretchability of PDMS allows for the creation of complex structures. However, it will be understood that the polymeric ceramic precursors may also include polysiloxanes, polysilsesquioxanes, polycarbosiloxanes, polycarbosilanes, polysilylcarbodiimides, polysilsesquicarbodiimides, polysilazanes, polysilsesquiazanes or any combination of the above In an embodiment, the inks are formed from a homogenous distribution of the particles in the elastomeric ceramic precursor material. For example, the weight percentage of the particles in the inks is in the range of from about 1% to about 90% and the weight percentage of the polymeric ceramic precursors in the inks is in the range of from about 10% to about 99%.

In the example given with reference to the Figures, crystalline $ZrO_2$ (Zirconium dioxide) nanoparticles with a primary average size of 20-50 nm in diameter were incorporated into a PDMS matrix, forming a jammed network within the polymer matrix while serving as barriers to mass and heat transfer in the polymer matrix, to thereby eliminate shrinkage upon ceramization.

It will be understood that the nanoparticles may also include other variants, such as but not limited to, calcium oxide particles, aluminium oxide particles, titanium dioxide particles, indium oxide particles, zinc oxide particles, silicon dioxide particles, aluminium nitride particles, calcium silicate particles, silicon carbide particles, polymeric particles, metallic particles, carbon black particles, graphene particles, graphite particles, diamond particles, other refractory materials or any combination of the particles listed above. The particles, in the embodiment, are characterized by an average diameter of about 100 μm or less and may be uniformly or non-uniformly distributed powders or fibres or tubes or any other regular shapes or any other combination of the above.

Referring to FIG. 1, an embodiment includes a DIW apparatus 100 which is used to fabricate one or more 4D elastomeric structures. A first elastic structure may be in the form of an elastic substrate 102. In an embodiment, the elastic substrate is in the form of a lattice of perpendicular strips of elastic ceramic precursor. Alternatively, the elastic substrate may be formed in a honeycomb pattern of interconnecting polygons or as a solid piece of elastic ceramic precursor. Moreover, the elastic substrate 102 may be formed by the gradual accumulation or deposition of one or more layers of elastic ceramic precursor.

The elastic substrate is subjected to tensile pressure along at least one axis 104. In an embodiment, the elastic substrate is subjected to tensile stress along the x-axis as shown in FIG. 1. This may be achieved by a stretching means, such as but not limited to, a uni-lateral stretching device. However, as would be understood by the person skilled in the art, the substrate may be subjected to tensile stress along any number of axes, and as such, the stretching device would be designed or modified in order to provide suitable tensile stress along those axes. For example, a stretching means may also include a bi-axial or multi-axial stretching device.

In an embodiment, the DIW apparatus 100 is also be used to fabricate a second elastic structure. The second elastic structure may be in the form of a ceramic precursor 106 formed from one or more layers of elastic ceramic precursor. The ceramic precursor 106 may also include one or more creases or areas of lower bending stiffness relative to other area of the ceramic precursor 106 or one or more creases or areas of uniform bending stiffness. The ceramic precursor 106 may also include areas of relatively fewer layers, such that the ceramic precursor may include areas of relatively reduced thickness and bending stiffness. The ceramic precursor 106 may be shaped to form a Miura-ori pattern, lattice, strip or any other suitable shape of elastic ceramic precursor material to form the desired 4D elastomeric object.

The ceramic precursor 106 is attached to the elastic substrate, while the elastic substrate is subjected to tensile stress. The ceramic precursor 106 is attached to the elastic substrate by one or more joins. In an embodiment, the one or more joins are printed or fabricated on to the elastic substrate by a DIW apparatus 100. The one or more joins are provided to the elastic substrate at buckling critical locations in accordance with the desired shape of the 4D elastomeric object. For example, in FIG. 1, the one or more joins 112 are provided to the boundary of the shape along the axis of tensile stress. The one or more joins 112 may be cuboid, cylindrical or any other suitable shape that provides sufficient contact between the elastic substrate, the one or more joins, and the ceramic precursor. In an embodiment, once the ceramic precursor is in connection with the elastic substrate via the one or more joins, heat is applied to enable the joins to connect the ceramic precursor and elastic substrate together at 114. Heat may be applied to the ceramic precursor, elastic substrate and the one or more joins by means of an oven, heating plate or pin point application.

For instance, the joins may be also made of printable inks, which share the same printable inks with the two elastic structures 106 and 110. Upon heating the joints at a predetermined temperature e.g. 150° C. for 30 mins, the liquid joints i.e. inks are solidified. Hence, the joints may connect the two elastic structures even after the releasing of the prestrains.

Once the ceramic precursor and elastic substrate have been joined together, the tensile stress subjected to the elastic substrate is released. Due to the elastomeric properties of the elastic substrate, returns to its original dimensions. Due to the high stretch ratio of the ceramic precursor, the substrate does not experience plastic deformation. The release of the elastic substrate releases the elastic potential energy stored in the pre-stretched structure. However, as the ceramic precursor is now joined to the elastic substrate, the elastic potential energy is transferred to the ceramic precursor. The ceramic precursor is subjected to compressive stress as the elastic substrate returns to its original dimensions. As a result, the ceramic precursor buckles, folds or deforms in the areas of reduced bending stiffness 116 within the pattern which forms a 4D elastomeric object.

In accordance with the broader concept and the embodiments described and defined herein, the 4D elastomeric object may be transformed into a 4D ceramic object. The elastomer-to-ceramic transformation may include the application of pyrolysis in inert atmosphere, oxidation in oxidative atmosphere or a combination of the techniques.

In an embodiment, the 4D elastomeric object is first subjected to pyrolysis in inert atmosphere to produce a first elastomer derived ceramic (EDC) object 118. The inert atmosphere may include argon gas or another inert gas. Alternatively, the 4D elastomeric object is subjected to heating in contained area containing a vacuum. Heating of the 4D elastomeric object may occur between 400° C. to 2000° C. The first EDC object 118 is then subjected to oxidation by heat treatment such as heating the first EDC object in 1000° C. in an oxygen rich atmosphere e.g. in air to produce a second EDC object 120. The combination of both steps provides a relative increase in density when comparing the first EDC object 118 to the second EDC object 120. Furthermore, the combination of both techniques enables the resulting 4D ceramic object to be formed in different colours.

Figure 2:
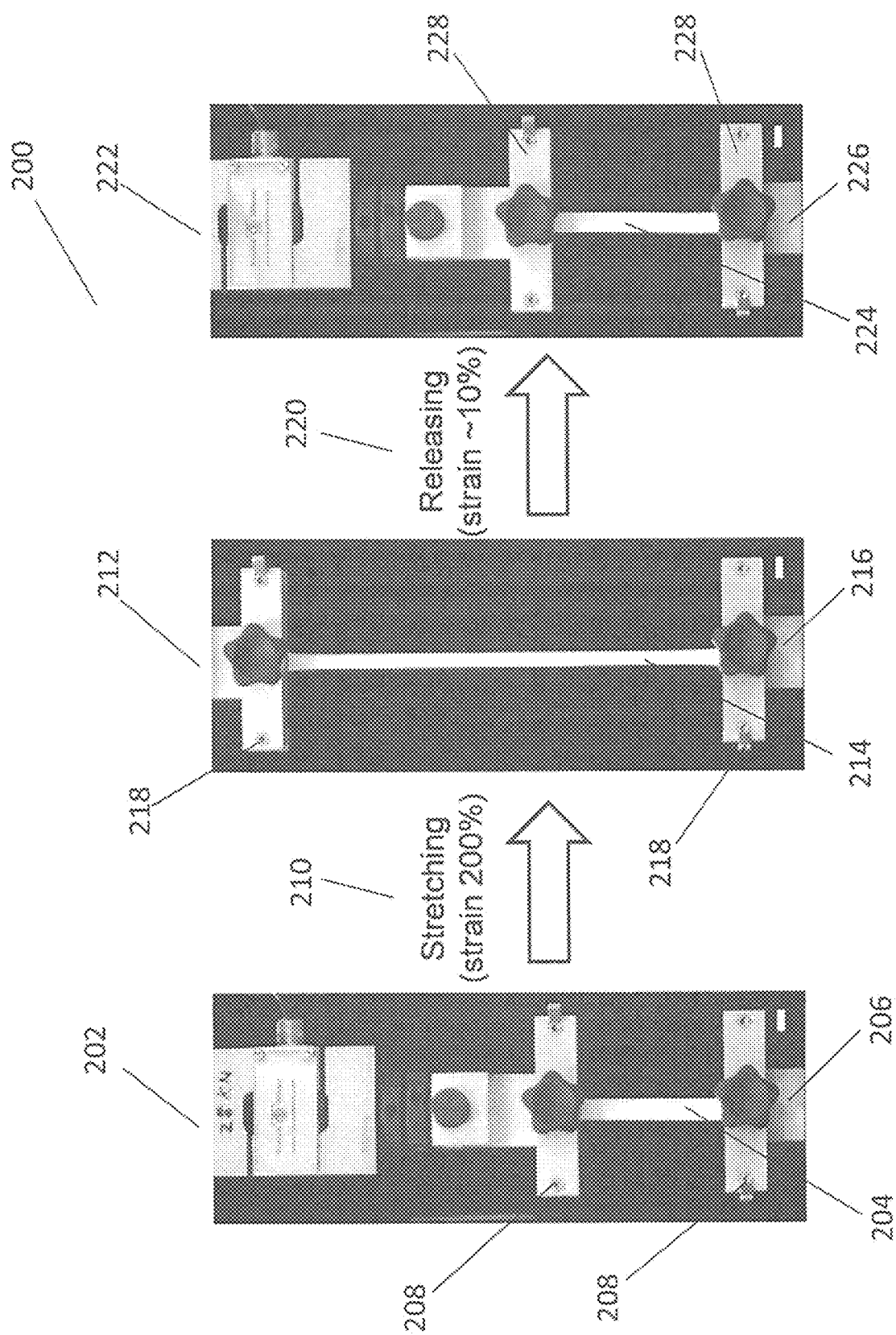
FIG. 2 illustrates the deformation of a ceramic precursor under tensile stress with reference to scale bars of 1 cm in accordance with an embodiment of the invention.

Referring to FIG. 2, a stretching apparatus 200 is provided at different stages. A first stage 202 includes an elongated portion of a first elastic structure 204 within a uni-axial stretching device 206. The uni-axial stretching device 206 includes a pair of clamps 208, which retain the distal ends of the first elastic structure 204. The first elastic structure is stretched at 210 and deformed.

In a second stage 212, the elongated portion of a first elastic structure 214 is deformed within a uni-axial stretching device 216 between clamps 218. By way of example only, the first elastic structure 214 is deformed to twice its original length as measured by a stretch ratio of 3 i.e. beyond 3 times its original length, or a 200% increase in length due to deformation. However, the first elastic structure 214 may be deformed up to an including three or four times its original length and as such may have a stretch ratio of three or four respectively. The tensile stress is then released at 220.

In a third stage 222, the elongated portion of a first elastic structure 224 has been released from the tensile stress by the uni-axial stretching device 216 having the clamps 218 move towards one another. This results in the elongated portion of a first elastic structure 224 having an approximate residual stretch ratio of 0.1.

In an embodiment, the weight percentage of the nanoparticles in the inks is in the range of from about 1% to about 90% and the weight percentage of the polymeric ceramic precursors in the inks is in the range of from about 10% to about 99%. For the purposes of demonstrating the workings of the invention, an example is provided that includes inks with two different weight percentages of nanoparticles. In a first ink mixture, the ceramic precursor of PDMS includes 20 wt % of zirconium dioxide nanoparticles. In a second ink mixture, the ceramic precursor of PDMS includes 40 wt % of zirconium dioxide nanoparticles.

Figure 3:
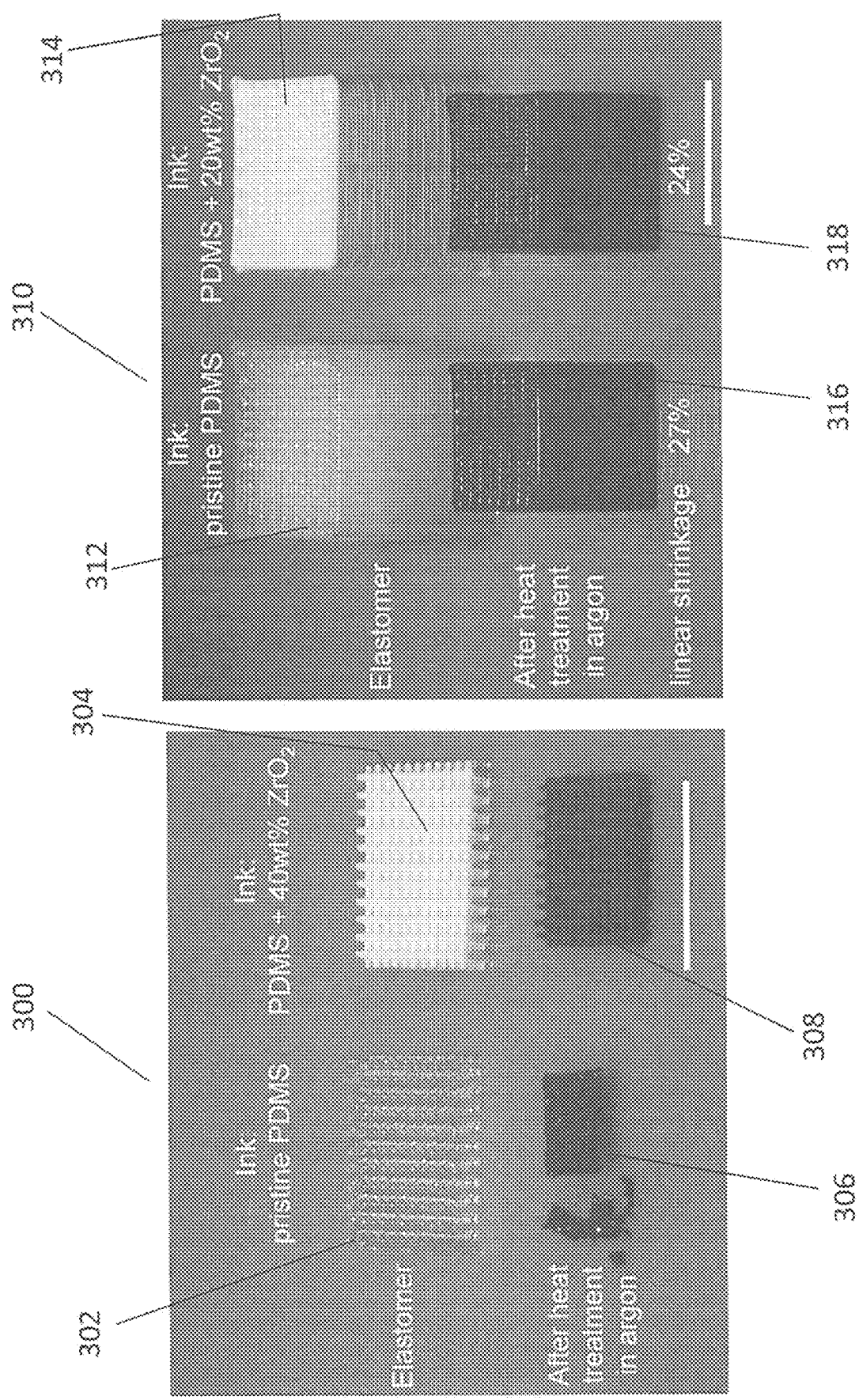
FIG. 3 illustrates the effect of heat treating the ceramic precursor with reference to scale bars of 1 cm in accordance with an embodiment of the present invention.

Referring to FIG. 3, a comparison 300 is provided between a first elastic substrate formed from PDMS 302 and second elastic substrate formed from PDMS and 40 wt % of zirconium dioxide nanoparticles 304. Each of the elastic substrates 302 and 304 are subjected to heating in an atmosphere of argon. The first elastic substrate formed from PDMS 302 is transformed via the heating process into a first ceramic object 306 which is shown to have poor structural stability. The second elastic substrate formed from PDMS and 40 wt % of zirconium dioxide nanoparticles 304 is transformed via the heating process into a second ceramic substrate 308, which is shown to have maintained its structure but has exhibited some shrinkage.

A further comparison 310 is provided between a first elastic substrate formed from PDMS 312 and second elastic substrate formed from PDMS and 20 wt % of zirconium dioxide nanoparticles 314. Each of the elastic substrates 312 and 314 are subjected to heating in an atmosphere of argon. The first elastic substrate formed from PDMS 312 is transformed via the heating process into a first ceramic object 316 which is shown to have experience linear shrinkage of 27%. The second elastic substrate formed from PDMS and 20 wt % of zirconium dioxide nanoparticles 314 is transformed via the heating process into a second ceramic substrate 318, which is shown to experienced 24% shrinkage. The inclusion of zirconium dioxide nanoparticles at both 20 wt % and 40 wt % improves the structural stability and reduces the shrinkage of the precursor material when undergoing ceramization.

Figure 4:
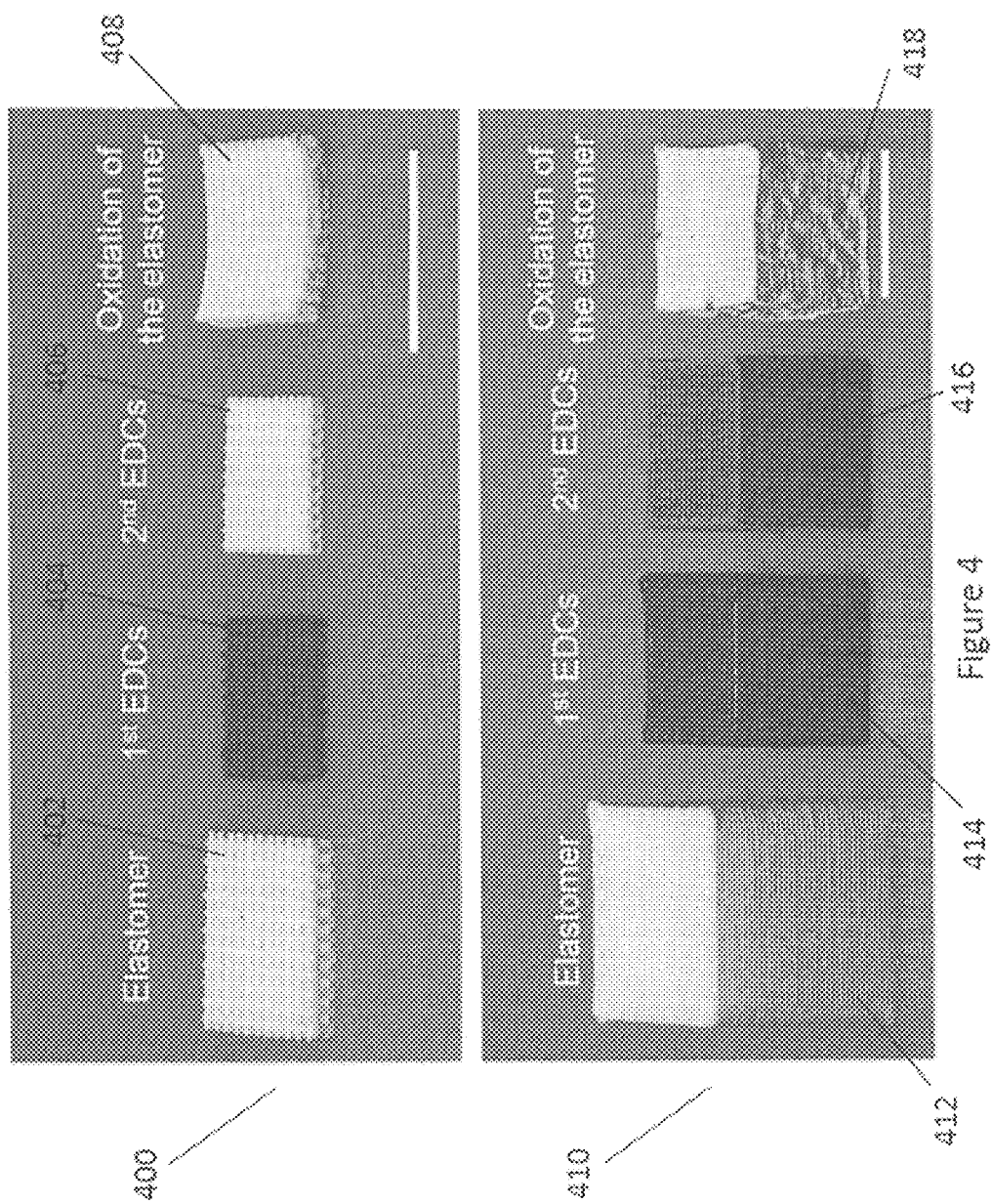
FIG. 4 illustrates the effect of oxidation on the ceramic precursor with reference to scale bars of 1 cm in accordance with an embodiment of the present invention.

Referring to FIG. 4, a comparison is provided between the first ink mixture 400 formed from PDMS and 40 wt % of zirconium dioxide nanoparticles and the second ink mixture 410 formed from PDMS and 20 wt % of zirconium dioxide nanoparticles.

The elastic substrate including 40 wt % of zirconium dioxide nanoparticles 402 is first subjected to heating in an inert atmosphere to produce a first EDC 404. The first EDC 404 is subsequently subjected to oxidation to form a second EDC 406.

The first EDC 404 and second EDC 406 show increased structural integrity compared with a first elastic precursor 408 which was subjected to oxidation without first being subjected to heating.

The elastic substrate including 20 wt % of zirconium dioxide nanoparticles 412 is first subjected to heating in an inert atmosphere to produce a first EDC 414. The first EDC 414 is subsequently subjected to oxidation to form a second EDC 416. The first EDC 414 and second EDC 416 show increased structural integrity compared with a first elastic precursor 418 which was subjected to oxidation without first being subjected to heating.

Figure 5:
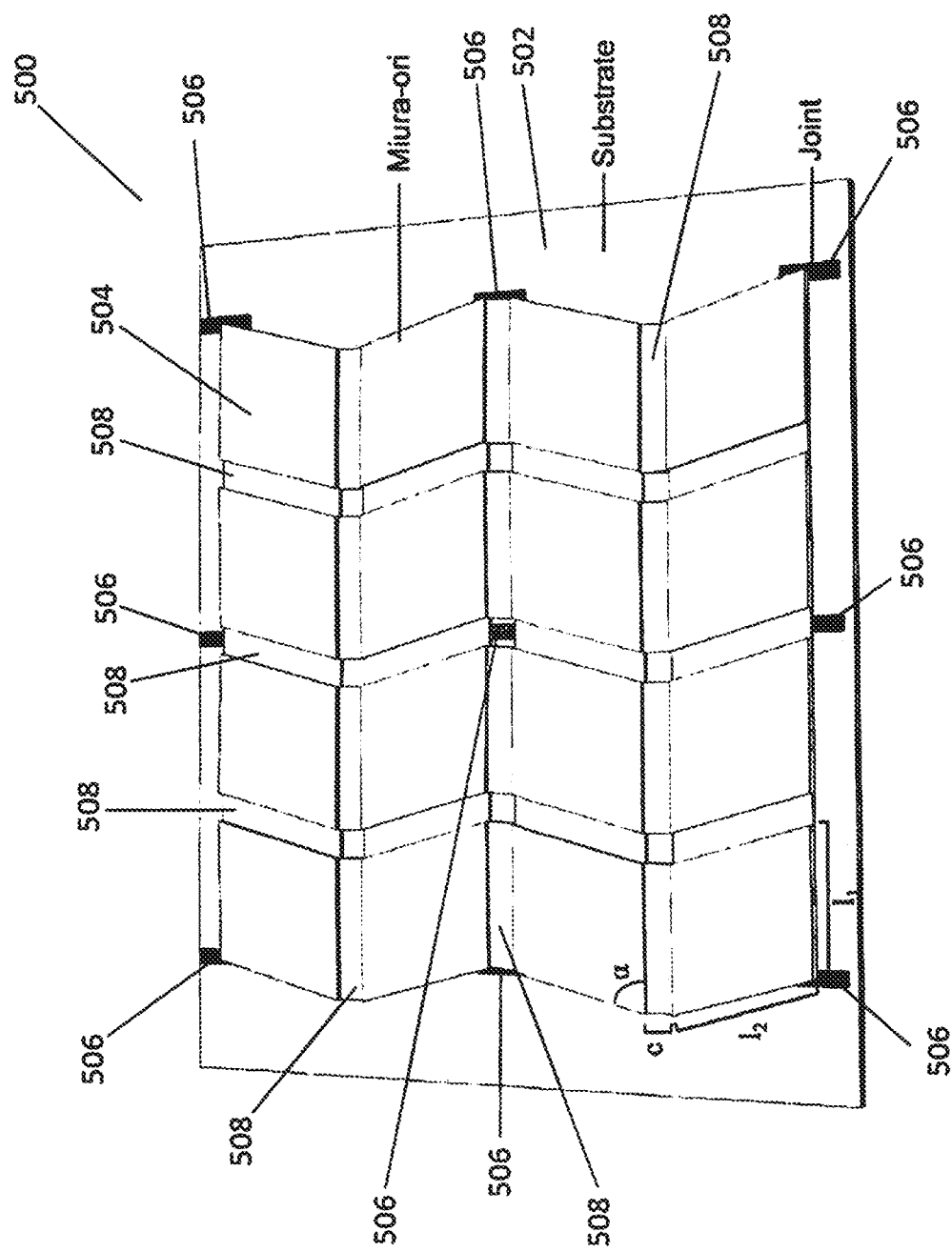
FIG. 5 illustrates a schematic of a Miura-ori pattern in accordance with an embodiment of the present invention.

Referring to FIG. 5, an embodiment is provided that includes a Miura-ori patterned ceramic precursor and elastic substrate 500. The elastic substrate 502 is connected to the ceramic precursor 504 by joins 506. The Miura-ori patterned ceramic precursor 504 includes one or more creases 508 which are areas of reduced bending stiffness. The creases 508 act to define the Miura-ori pattern on the ceramic precursor. By way of an example only, the ceramic precursor in a Miura-ori pattern includes the geometric parameters of $l_1=l_2=9$ mm, c=1.8 mm, and $\alpha=75°$, as the Miura-ori can pattern can serve as an elementary geometric construction for engineering more complex-shaped origami structures so to assist the reader to understand the workings of the invention. As such, it would be understood by the person skilled in the art that other geometric parameters and patterns may be used.

Figure 7:
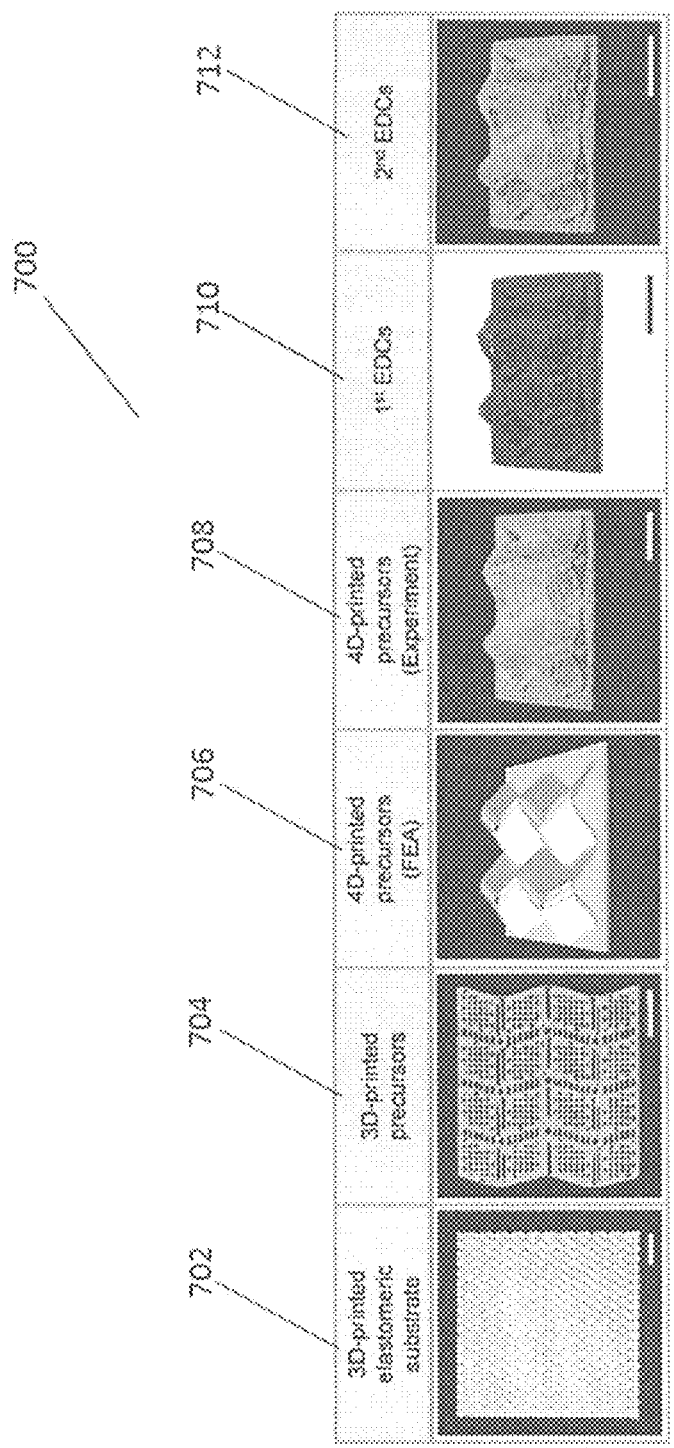
FIG. 7 illustrates the stages of compressive buckling-induced ceramic origami for a 4D-printed ceramic object with the Miura-ori pattern with reference to scale bars of 1 cm in accordance with an embodiment of the present invention.

For example, a further example of geometric parameters is provided in the optical images depicted in FIG. 7. An embodiment of the present invention may include the fabrication of the elastic substrate including a nine-layer triangular pattern (6 cm×6 cm×0.3 cm, nozzle diameter 410 µm, center-to-center ligament spacing 1 mm). The ceramic precursor includes creases of sufficient depth on the surface in order to provide areas of lower bending stiffness or uniform bending stiffness. The areas of lower bending stiffness or uniform bending stiffness enable easy folding and buckling deformation of the structure. The ceramic precursor includes a three-layers of ink parallelogram pattern with an overall height of approximately 0.7 mm. In particular, the three-layers of ink includes layers of printed ligament, each thickness of which includes diameter of extruded ligament of about 410 µm. The creases are formed to a depth of one-layer between the patterns. That is, the creases are areas, or paths of reduced ceramic precursor thickness. Furthermore, the Miura-ori design may be filled with square patterns with a center-to-center ligament spacing of 1 mm. Cuboid joins may also be provided to join the elastic substrate and ceramic precursor. The joins may have the dimensions of 3.5 mm×0.9 mm×0.3 mm, wherein the entire structure is heated in order to fuse the joints.

The inks are extruded by means of a nozzle provided to the DIW apparatus (not shown), where the nozzle may be provided with a variety of different nozzle dimensions. For example, the nozzle diameter may be 410 µm.

Figure 6:
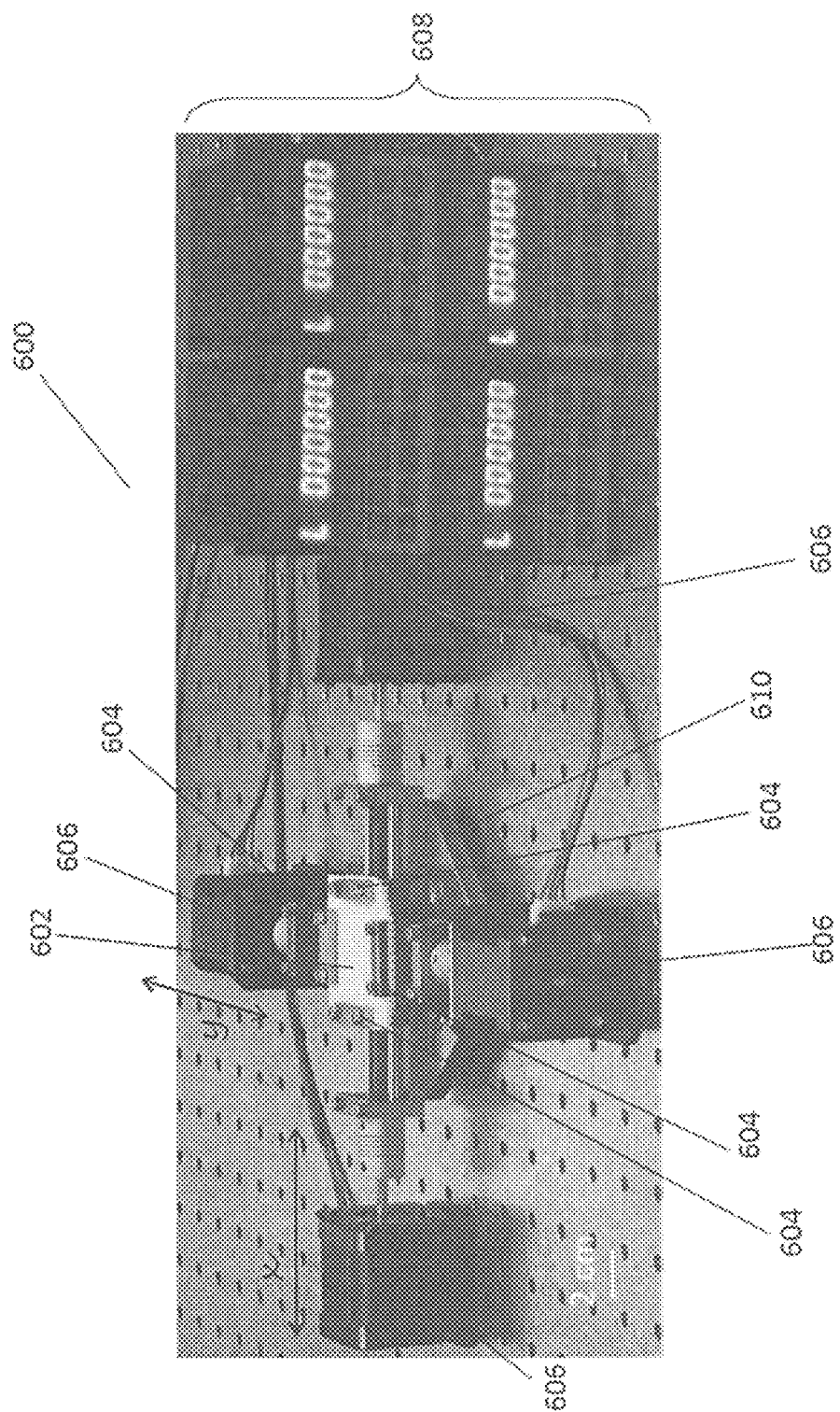
FIG. 6 illustrates a stretch device in accordance with an embodiment of the present invention.

Referring to FIG. 6, an example of a bi-axial stretching device 600 is provided. A square elastic substrate 602 is provided wherein, each side of the elastic substrate 602 is held by a clamping portion 604. Each clamping portion 604 is retracted in order to subject the elastic substrate 602 to tensile stress in both the x and y axes. The clamps may be retracted by a variety of different mechanisms. For example, the clamping portions 604 may be connected to two pairs of stepper motors 606 which provide a fine level of control over the tensile stress provided to the elastic substrate 602. Furthermore, the stepper motors may be programmable. For example, during the process of releasing the tensile stress from the substrate, the releasing speeds of the substrate in x and y directions may be 4.86 millimetres per second and 2.00 millimetres per second respectively. Further, a control or displacement measuring means 608 may also be included in the stretching device 600. Moreover, a base 610 may also be provided to support the elastic substrate whilst being subjected to tensile stress.

Referring to FIG. 7, a comparison 700 is provided of simulated and experimental results of fabricating a 4D ceramic object in accordance with the broader concept and the embodiments described and defined herein. The elastic substrate 702 and ceramic precursor 704 are fabricated using one of the additive manufacturing methods described above, such as but not limited to, DIW printing. The elastic substrate 702 is subjected to tensile stress and connected to ceramic precursor 704 as previously described to form a 4D printed ceramic precursor. A Finite Element Analysis (FEA) simulation was undertaken to determine the expected shape of the 4D printed ceramic precursor 706. A prototype 4D printed ceramic precursor 708 was fabricated in accordance with the above described method, which was subjected to heating to form a first EDC 710 and subsequently subjected to oxidation to form a second EDC 712. As can be seen from the figures, the expected shape of the 4D printed ceramic precursor 706 and the prototype 4D printed ceramic precursor 708 are very similar to one another.

In one example embodiment of ink system, liquid PDMS (XE15-645, Momentive Performance Materials) is formulated by mixing PDMS prepolymer and curing agent at a 1:1 weight ratio. The ink mixture is manually blended by a glass rod for 30 minutes. 40 wt % (11 vol %) $ZrO_2$ NPs is then added. After manually blending or mixing by the triple rollers mills (EXAKT: 80E) for 2 hours, the ink mixture is poured into a printing syringe and is degassed for 2 hours at room temperature. Advantageously, the ink is printable for over 8 hours at room temperature, and its printability could last for over half a year if stored in a refrigerator at −80° C. (Thermo Scientific).

In another example embodiment of ink system, liquid PDMS (SE1700 clear) is formulated by mixing PDMS prepolymer and curing agent at a 10:1 weight ratio. The ink mixture is manually blended by a glass rod for 30 minutes. 20 wt % $ZrO_2$ NPs is then added, mixed by the triple rollers mills (EXAKT: 80E) for 2 hours, and poured into printing syringe. Afterwards, the ink is centrifuged to remove gas bubbles.

Figure 8:
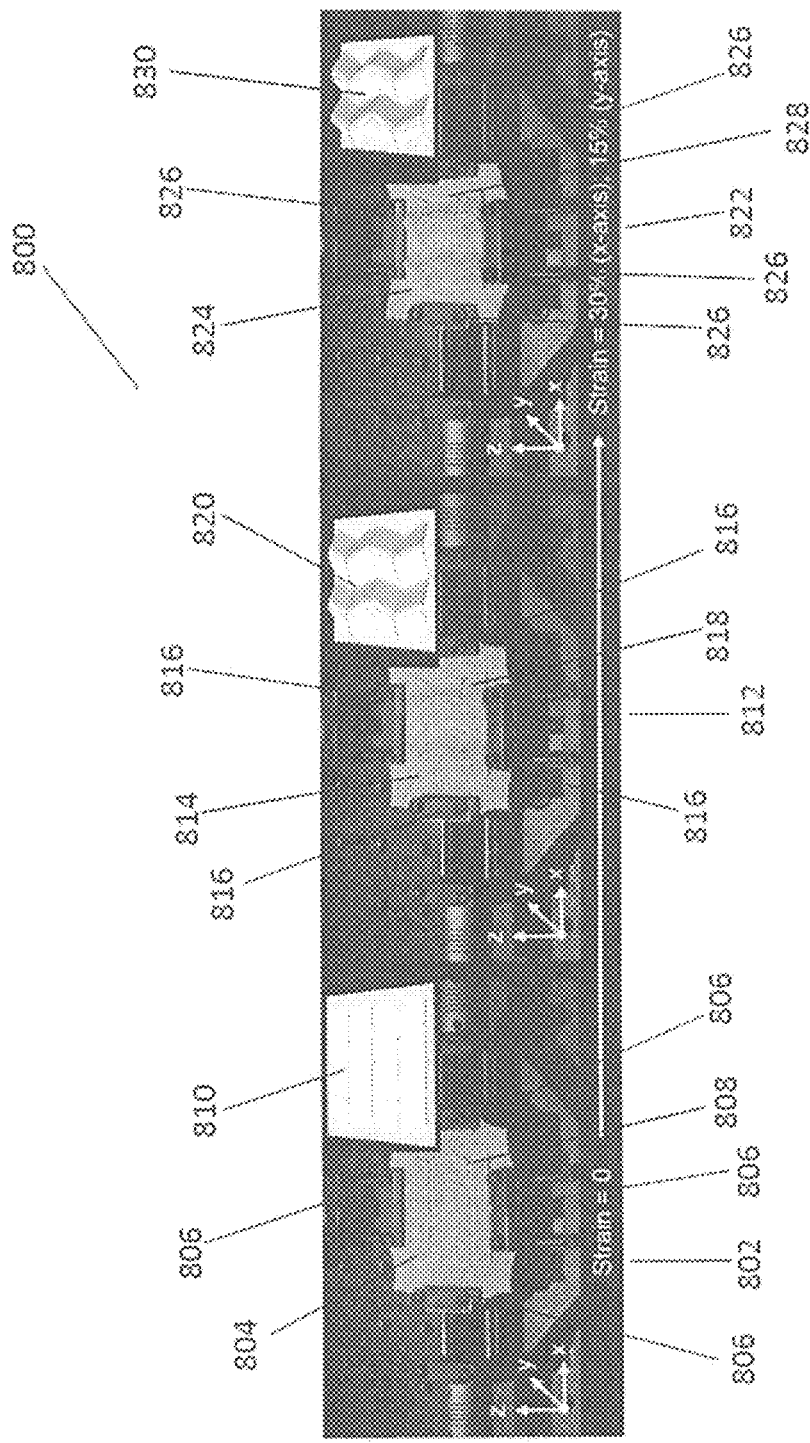
FIG. 8 illustrates the process of forming a 4D-printed elastomeric object with the Miura-ori pattern in accordance with an embodiment of the present invention.

Referring to FIG. 8, an embodiment is provided which shows a bi-axial stretching device 800 to provide tensile stress to the elastic substrate at three stages. At a first stage 802, the elastic substrate 804 is under tensile stress provided by two pairs of clamps 806 which are provided along the x-axis and y-axis boundaries of the elastic substrate. The tensile stress results in strain i.e. maximum compressive strain of the precursors or the second elastic structure along the x-axis of 30% and along the y-axis of 15%. A ceramic precursor 808 shaped to form a Miura-ori pattern is in connection with a first face of the elastic substrate. A FEA simulation 810 shows the elastic substrate and ceramic precursor in further detail. In the first stage 802 the ceramic precursor experiences no buckling.

A second stage 812 is provided which shows a gradual release of the tensile stress subjected to the elastic substrate 814. The second stage 812 includes the clamps 816 extending towards the elastic substrate 814 resulting in the ceramic precursor 818 starting to buckle in accordance with the areas of reduced bending stiffness in the Miura-ori pattern. A FEA simulation 820 shows the buckling of the ceramic precursor in further detail.

A third stage 822 is provided which shows a further release of the tensile stress subjected to the elastic substrate 824. The second stage 822 includes the clamps 826 extending further towards the elastic substrate 824 resulting in the ceramic precursor 828 experiencing significant buckling in accordance with the areas of reduced bending stiffness in the Miura-ori pattern. A FEA simulation 830 shows the buckling of the ceramic precursor in further detail.

Figure 9:
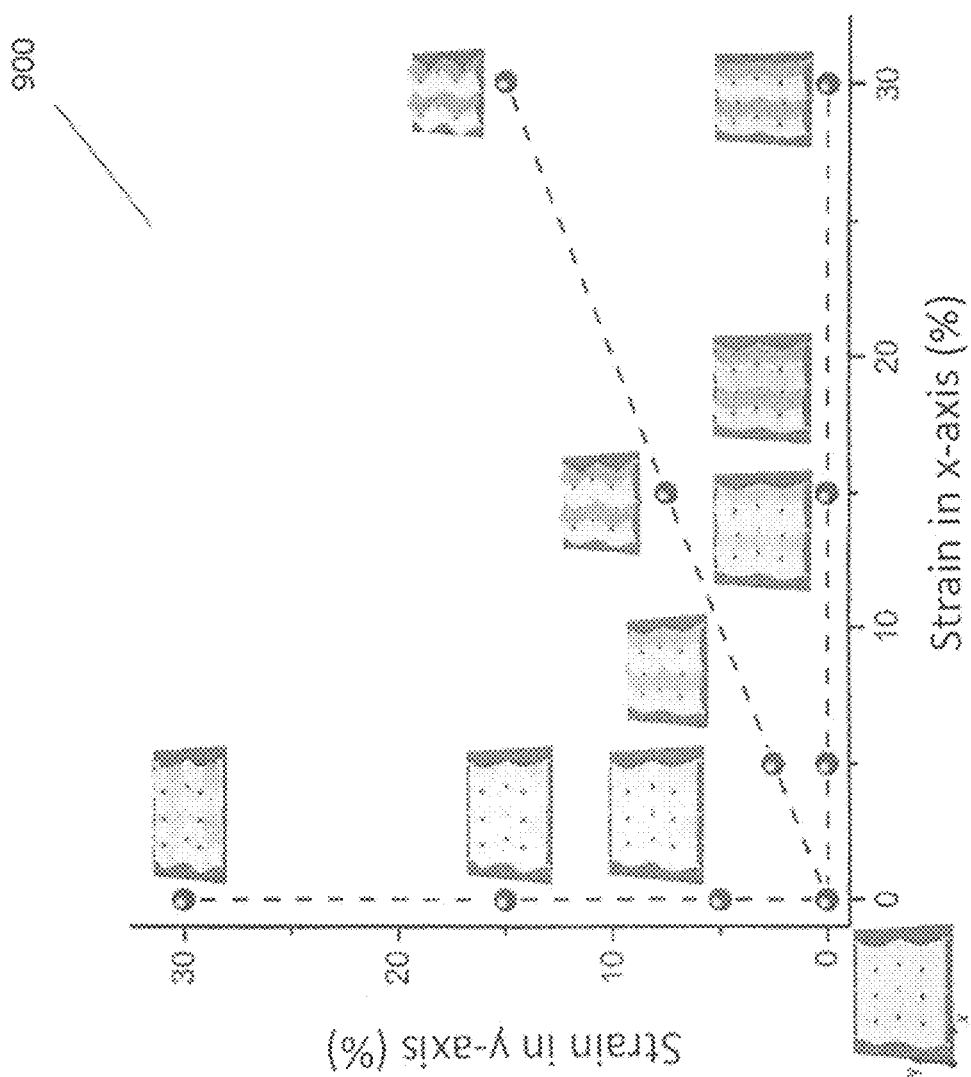
FIG. 9 illustrates a phase diagram of an FEA simulation of the variations of the Miura-ori pattern in accordance with an embodiment of the present invention.

Referring to FIG. 9 for the graph plotting the strain of the precursor in the y-axis against the strain of the precursor in the x-axis, a phase diagram 900 is provided which summarises the results of an FEA simulation conducted in relation to the hypothesized formation of 4D elastomeric object prior to ceramization. The phase diagram 900 illustrates series of complex-shaped ceramics with continuously variable geometries can be derived from a simple design.

Figure 10A:
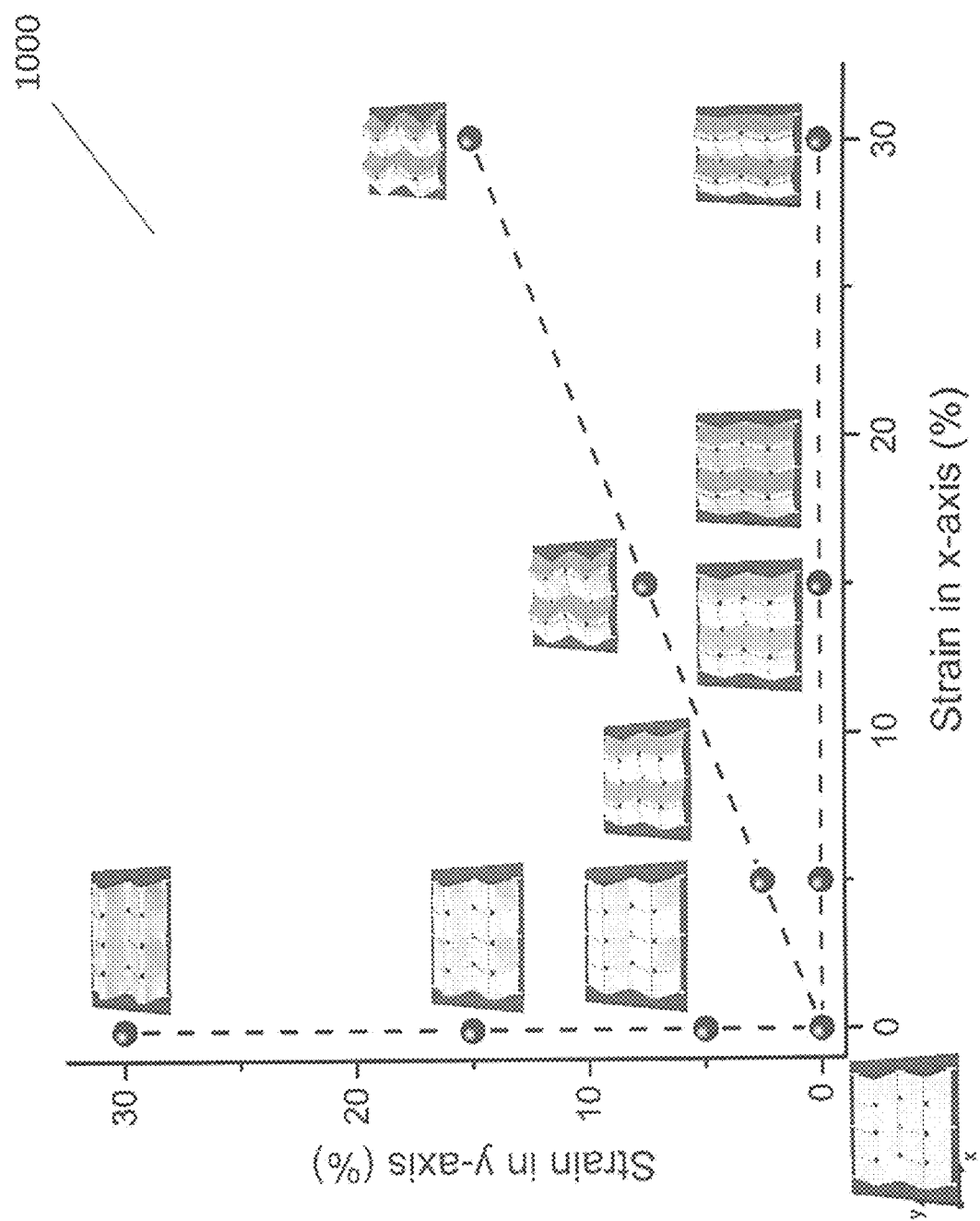
FIG. 10A illustrates a phase diagram of an experimental result of the variations of the Miura-ori pattern formed by elastomers in accordance with an embodiment of the present invention.
Figure 10B:
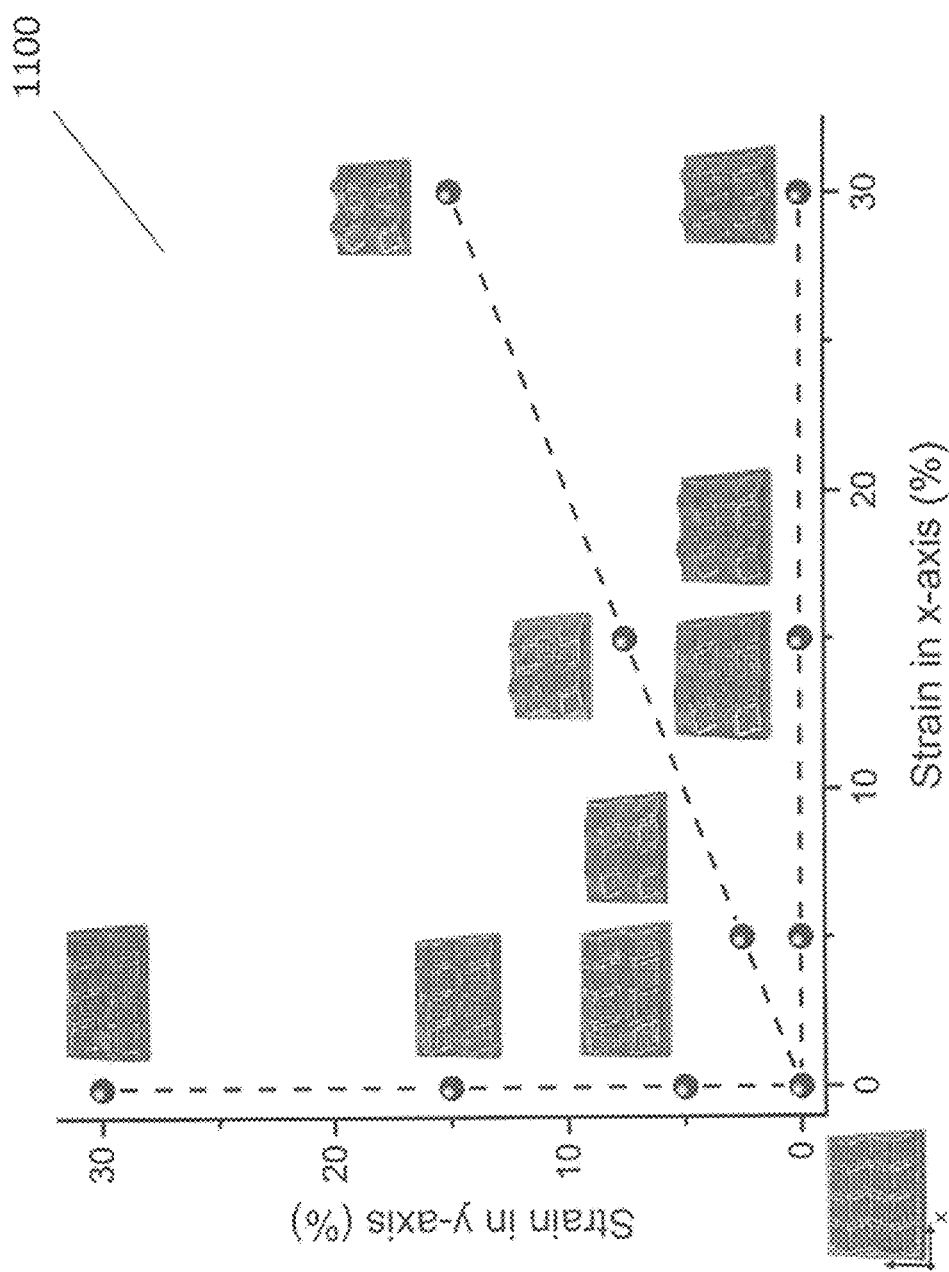
FIG. 10B illustrates a phase diagram of an experimental result of the variations of the Miura-ori pattern formed by elastomer-derived ceramics in accordance with an embodiment of the present invention.

Referring to FIG. 10A for the graph plotting the strain of the precursor in the y-axis against the strain of the precursor in the x-axis, a phase diagram 1000 is provided which summarises the results of elastomeric experimentation conducted in relation to the hypothesized formation of 4D elastomeric object prior to ceramization. Referring to FIG. 10B for the graph plotting the strain of the elastomer-derived ceramics in the y-axis against the strain of the elastomer-derived ceramics in the x-axis, a phase diagram 1100 is provided which summarises the results of elastomeric experimentation conducted in relation to the hypothesized formation of 4D ceramic object subsequent to ceramization. The phase diagram 900 illustrates series of complex-shaped ceramics with continuously variable geometries can be derived from a simple design.

Figure 11:
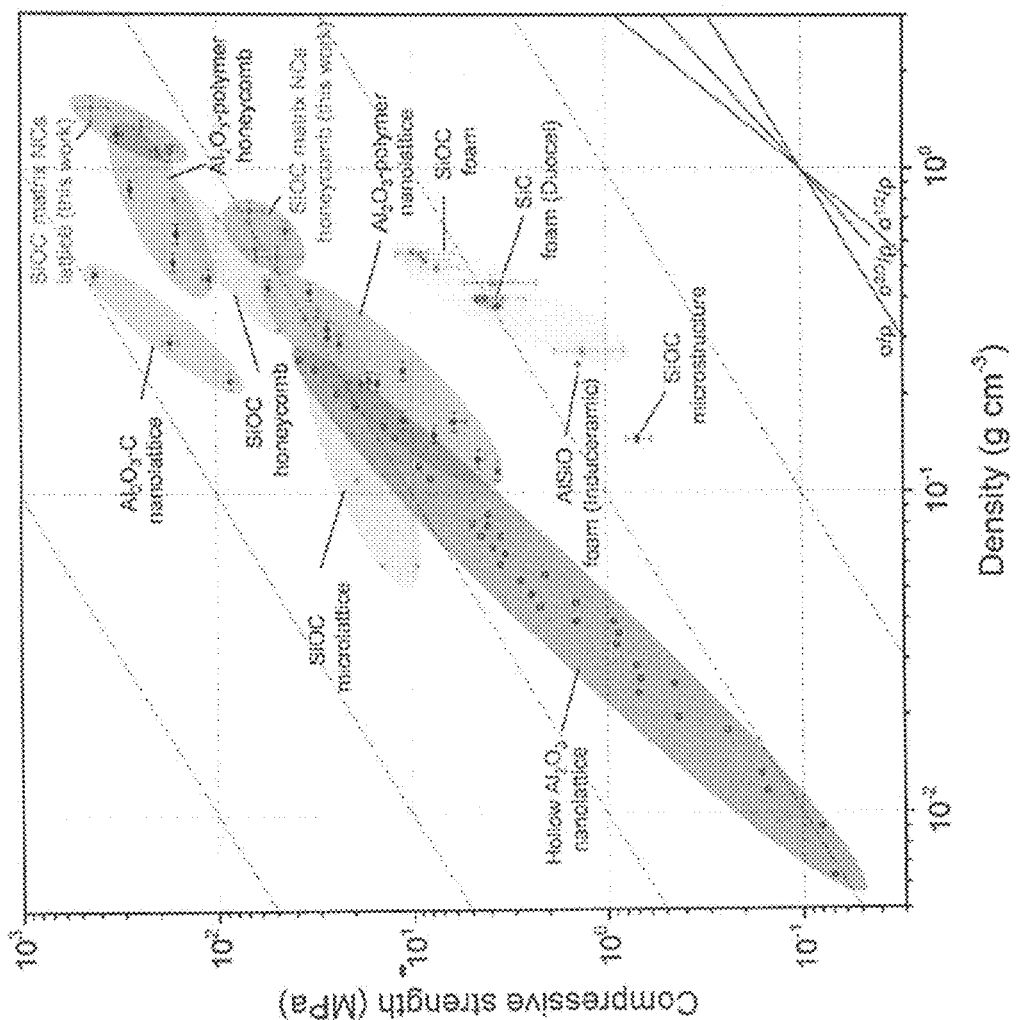
FIG. 11 illustrates compressive strength-density Ashby Chart showing the relative compressive strength of the precursor material in accordance with an embodiment of the present invention.

To characterize mechanical robustness of these ceramic architectures, compression tests were performed on printed ceramic lattices and honeycombs, both for first and second EDCs. The results of this testing were summarized in FIG. 11, FIG. 12, and Tables 1 and 2, where Tables 1 and 2 are provided on the following two pages.

Figure 12:
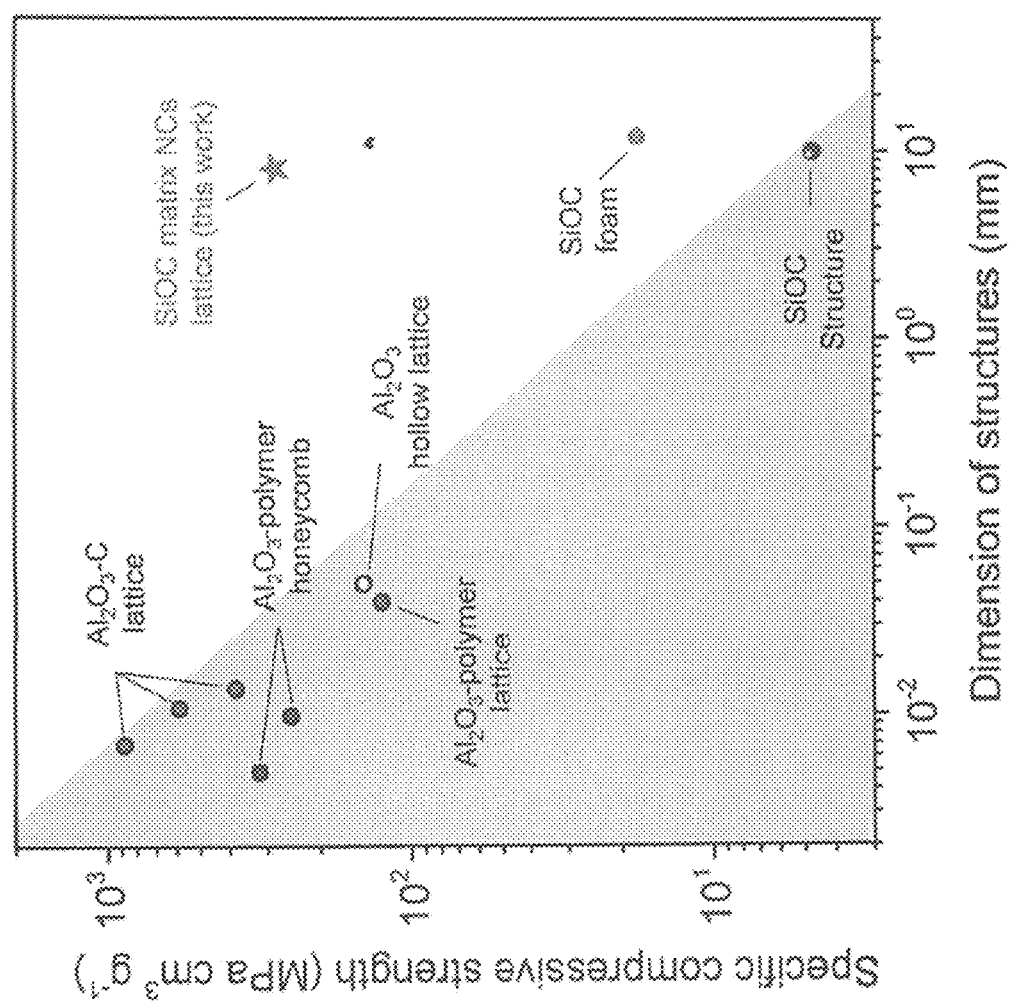
FIG. 12 illustrates strength-scalability synergy of the precursor material in accordance with an embodiment of the present invention.

A compressive strength of 547 MPa was achieved on the lattice structure at 1.6 g cm$^{-3}$, and the specific compressive strength of the tested EDCs was approximately nineteen times as high as conventional accessible SiOC foam. Ceramic structures as described and defined in the present invention overcame the strength-scalability trade-off in traditional printed ceramics, such as previous works of 3D-printed SiOC microstructures and ceramic/ceramic composite nanostructures constructed by 3D laser lithography and atomic layer deposition as shown in FIG. 12. Furthermore, unlike current use of 3D laser lithography, the present invention provided a means to fabricate large-scale ceramic architectures overcoming the challenge of scalability.

Therefore, the broad concept and the embodiments described and defined herein provide both light and strong hierarchical ceramic structures have great potential for the fabrication of multiscale mechanical metamaterials.

TABLE 1

Compression test samples with various conditions.

| Ink | Material | Mximum temperature in heat treatment for 1$^{st}$ EDCs (° C.) | Atmosphere in heat treatment for 1$^{st}$ EDCs | Architecture | Geometry | d (μm) | a (mm) | b (mm) | Dimensions of the precursor* (mm) | Mass of the precursor (g) | Dimensions of the sample (mm) | Mass of the sample (g) | Density (g cm$^{-3}$) | Compressive strength (MPa) |
|---|---|---|---|---|---|---|---|---|---|---|---|---|---|---|
| System 1 | 1$^{st}$ EDCs | 1000 | Vacuum | Lattice | See FIG. 13A | 208 | 0.64 | 0.64 | 10.40 × 10.38 × 1.59 | 0.162 | 8.40 × 8.40 × 1.30 | 0.108 | 1.18 | 205.8 |
| System 1 | 1$^{st}$ EDCs | 1000 | Vacuum | Lattice | | 208 | 0.64 | 0.64 | 10.32 × 10.32 × 1.52 | 0.151 | 8.33 × 8.33 × 1.25 | 0.099 | 1.14 | 160.4 |

TABLE 1-continued

Compression test samples with various conditions.

Figure 13E:
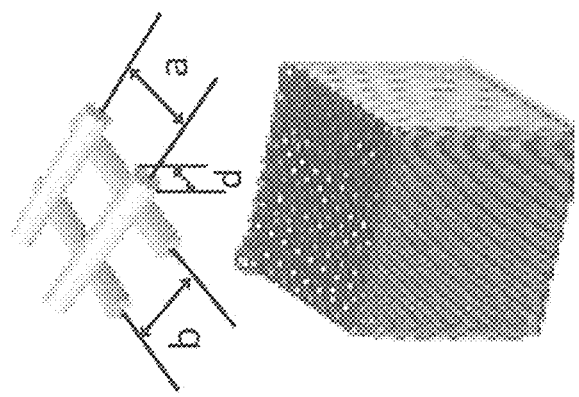
Figure 13D:
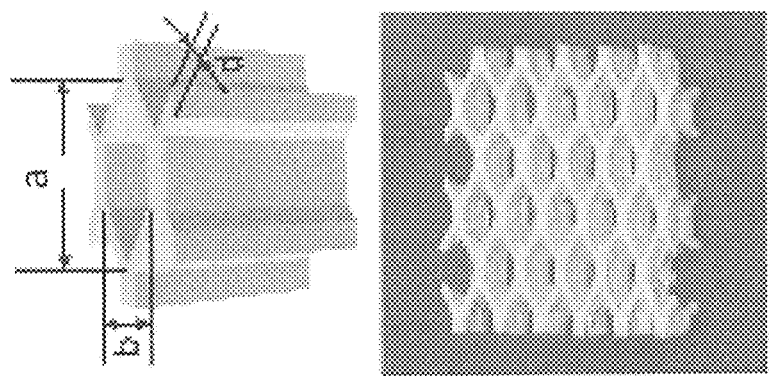
Figure 13C:
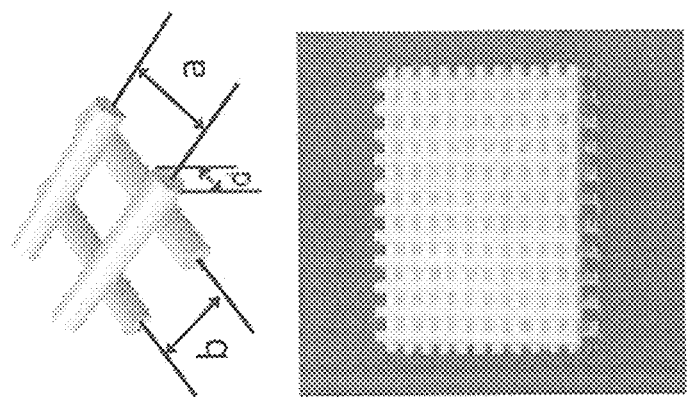

| Ink | Material | Mximum temperature in heat treatment for 1st EDCs (° C.) | Atmosphere in heat treatment for 1st EDCs | Architecture | Geometry | d (μm) | a (mm) | b (mm) | Dimensions of the precursor* (mm) | Mass of the precursor (g) | Dimensions of the sample (mm) | Mass of the sample (g) | Density (g cm$^{-3}$) | Compressive strength (MPa) |
|---|---|---|---|---|---|---|---|---|---|---|---|---|---|---|
| System 1 | 1st EDCs | 1000 | Vacuum | Lattice | | 208 | 0.64 | 0.64 | 10.50 × 10.50 × 1.54 | 0.136 | 8.44 × 8.42 × 1.21 | 0.089 | 1.04 | 150.2 |
| System 1 | 1st EDCs | 1000 | Argon | Lattice | | 208 | 0.64 | 0.64 | 10.72 × 10.61 × 1.60 | 0.173 | 8.62 × 8.52 × 1.31 | 0.112 | 1.16 | 207.0 |
| System 1 | 1st EDCs | 1000 | Argon | Lattice | | 208 | 0.64 | 0.64 | 10.72 × 10.59 × 1.51 | 0.155 | 8.57 × 8.49 × 1.21 | 0.100 | 1.14 | 211.2 |
| System 1 | 1st EDCs | 1000 | Argon | Lattice | | 208 | 0.64 | 0.64 | 10.70 × 10.58 × 1.46 | 0.148 | 8.62 × 8.42 × 1.20 | 0.094 | 1.08 | 174.0 |
| System 1 | 1st EDCs | 1000 | Argon | Honeycomb | See FIG. 13B | 208 | 2.25 | 1.30 | 11.02 × 10.25 × 1.93 | 0.086 | 0.96 × 8.30 × 1.55 | 0.057 | 0.49 | 34.2 |
| System 1 | 1st EDCs | 1000 | Argon | Honeycomb | | 208 | 2.25 | 1.30 | 11.06 × 10.21 × 1.66 | 0.088 | 8.85 × 8.28 × 1.36 | 0.057 | 0.57 | 53.9 |
| System 1 | 1st EDCs | 1000 | Argon | Honeycomb | | 208 | 2.25 | 1.30 | 11.20 × 10.49 × 1.58 | 0.080 | 8.98 × 8.54 × 1.25 | 0.052 | 0.54 | 58.6 |
| System 1 | 1st EDCs | 1000 | Argon | Honeycomb | | 208 | 2.25 | 1.30 | 10.95 × 10.29 × 2.30 | 0.135 | 8.90 × 8.39 × 1.83 | 0.087 | 0.64 | 41.6 |
| System 1 | 1st EDCs | 1000 | Argon | Honeycomb | | 208 | 2.25 | 1.30 | 11.13 × 10.02 × 2.12 | 0.116 | 8.92 × 8.10 × 1.68 | 0.075 | 0.62 | 46.8 |
| System 1 | 1st EDCs | 1000 | Argon | Honeycomb | | 208 | 2.25 | 1.30 | 10.86 × 10.07 × 2.38 | 0.145 | 8.74 × 8.18 × 1.93 | 0.095 | 0.69 | 42.9 |
| System 1 | 2nd EDCs | 1000 | Vacuum | Lattice | See FIG. 13C | 203 | 0.63 | 0.63 | 8.25 × 8.25 × 1.26 | 0.095 | 8.01 × 8.01 × 1.21 | 0.092 | 1.19 | 172.2 |
| System 1 | 2nd EDCs | 1000 | Vacuum | Lattice | | 203 | 0.63 | 0.63 | 8.40 × 8.34 × 1.23 | 0.093 | 8.11 × 8.24 × 1.18 | 0.090 | 1.14 | 150.7 |
| System 1 | 2nd EDCs | 1000 | Vacuum | Lattice | | 203 | 0.63 | 0.63 | 8.38 × 8.42 × 1.27 | 0.097 | 8.20 × 8.16 × 1.22 | 0.095 | 1.16 | 175.2 |
| System 1 | 2nd EDCs | 1000 | Argon | Lattice | | 203 | 0.63 | 0.63 | 8.64 × 8.51 × 1.26 | 0.099 | 8.43 × 8.31 × 1.23 | 0.098 | 1.14 | 169.3 |
| System 1 | 2nd EDCs | 1000 | Argon | Lattice | | 203 | 0.63 | 0.63 | 8.59 × 8.51 × 1.24 | 0.101 | 8.40 × 8.30 × 1.22 | 0.100 | 1.18 | 182.9 |
| System 1 | 2nd EDCs | 1000 | Argon | Lattice | | 203 | 0.63 | 0.63 | 8.57 × 8.53 × 1.16 | 0.091 | 8.40 × 8.34 × 1.15 | 0.090 | 1.12 | 169.2 |
| System 1 | 2nd EDCs | 1000 | Argon | Honeycomb | See FIG. 13D | 203 | 2.20 | 1.27 | 8.89 × 8.24 × 1.29 | 0.056 | 8.71 × 8.15 × 1.25 | 0.054 | 0.61 | 74.3 |
| System 1 | 2nd EDCs | 1000 | Argon | Honeycomb | | 203 | 2.20 | 1.27 | 9.05 × 8.53 × 1.35 | 0.053 | 8.90 × 8.31 × 1.33 | 0.051 | 0.52 | 57.7 |
| System 1 | 2nd EDCs | 1000 | Argon | Honeycomb | | 203 | 2.20 | 1.27 | 9.02 × 8.52 × 1.34 | 0.060 | 8.80 × 6.30 × 1.33 | 0.057 | 0.59 | 57.3 |
| System 1 | 2nd EDCs | 1000 | Argon | Honeycomb | | 203 | 2.20 | 1.27 | 8.84 × 8.14 × 1.71 | 0.078 | 8.61 × 7.92 × 1.66 | 0.076 | 0.67 | 55.9 |
| System 1 | 2nd EDCs | 1000 | Argon | Honeycomb | | 203 | 2.20 | 1.27 | 8.84 × 8.36 × 1.76 | 0.095 | 8.56 × 8.12 × 1.71 | 0.094 | 0.79 | 75.1 |
| System 1 | 2nd EDCs | 1000 | Argon | Honeycomb | | 203 | 2.20 | 1.27 | 8.88 × 8.31 × 1.74 | 0.093 | 8.60 × 8.05 × 1.74 | 0.092 | 0.76 | 70.7 |
| System 2 | 1st EDCs | 1300 | Argon | Lattice | See FIG. 13E | 198 | 0.61 | 0.61 | 14.46 × 14.41 × 14.54 | 2.132 | 11.04 × 11.01 × 11.09 | 1.697 | 1.26 | 221.5 |

TABLE 1-continued

Compression test samples with various conditions.

| Ink | Material | Mximum temperature in heat treatment for 1$^{st}$ EDCs (° C.) | Atmosphere in heat treatment for 1$^{st}$ EDCs | Architecture | Geometry | d (μm) | a (mm) | b (mm) | Dimensions of the precursor* (mm) | Mass of the precursor (g) | Dimensions of the sample (mm) | Mass of the sample (g) | Density (g cm$^{-3}$) | Compressive strength (MPa) |
|---|---|---|---|---|---|---|---|---|---|---|---|---|---|---|
| System 2 | 1$^{st}$ EDCs | 1300 | Argon | Lattice | | 198 | 0.61 | 0.61 | 14.59 × 14.57 × 14.82 | 2.422 | 11.17 × 11.21 × 11.09 | 1.939 | 1.40 | 232.6 |
| System 2 | 1$^{st}$ EDCs | 1300 | Argon | Lattice | | 198 | 0.61 | 0.61 | 14 56 × 14.53 × 14.59 | 2.334 | 11.08 × 11.07 × 11.03 | 1.654 | 1.37 | 267.1 |

*Precursor; PDMS NCs for 1$^{st}$ EDCs; 1$^{st}$ EDCs for 2$^{nd}$ EDCs

TABLE 2

Compression test samples in FIG. 4 (Ink System 1, 1$^{st}$ EDCs from heat treatment in argon at 1300° C.).

Figure 14:
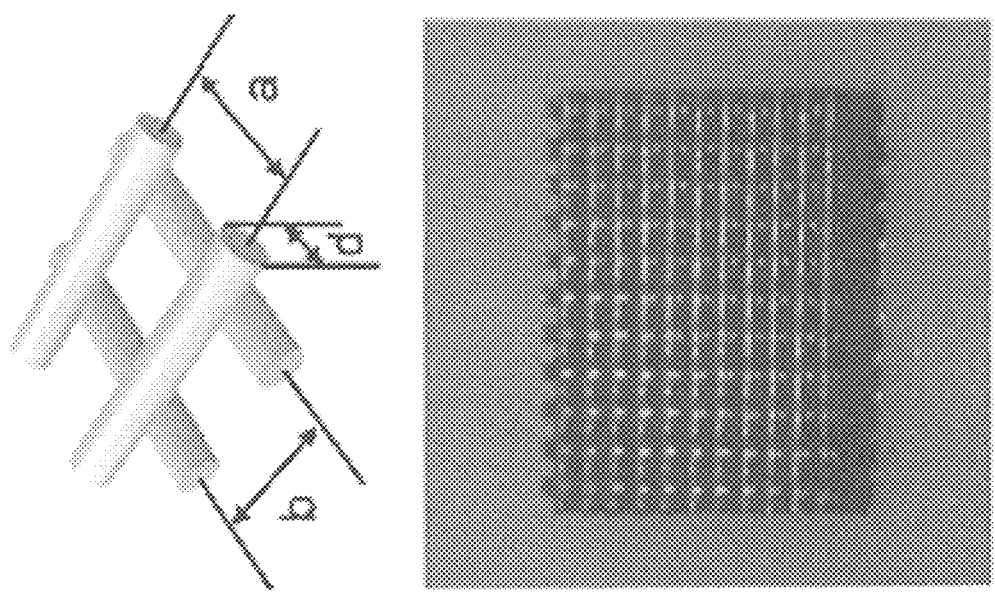
FIG. 14 is an illustration of an example geometric representation of the associated entries in Table 2.

| Geometry | d (μm) | a (mm) | b (mm) | Dimensions of the sample (mm) | Mass of the sample (g) | Density (g cm$^{-3}$) | Compressive strength (MPa) | Specific compressive strength (MPa cm$^3$ g$^{-1}$) |
|---|---|---|---|---|---|---|---|---|
| See FIG. 14 | 203 | 0.62 | 0.62 | 8.18 × 8,13 × 1.22 | 0.124 | 1.53 | 333.6 | 218.0 |
| | 203 | 0.62 | 0.62 | 8.15 × 8.10 × 1.34 | 0.121 | 1.36 | 301.6 | 221.0 |
| | 203 | 0.62 | 0.62 | 8.13 × 8.09 × 1.31 | 0 114 | 1.32 | 298.4 | 225.5 |
| | 203 | 0.62 | 0.62 | 8.13 × 8.00 × 1.32 | 0.119 | 1.38 | 316.4 | 229.8 |
| | 203 | 0.62 | 0.62 | 7.74 × 7.71 × 1.13 | 0.117 | 1.74 | 453.8 | 260.8 |
| | 203 | 0.62 | 0.62 | 8.14 × 8.07 × 1.34 | 0.130 | 1.48 | 385.9 | 261.5 |
| | 203 | 0.62 | 0.62 | 7.90 × 7.84 × 1.20 | 0.127 | 1.70 | 484.9 | 285.2 |
| | 203 | 0.62 | 0.62 | 7.97 × 7.78 × 1.21 | 0 122 | 1.63 | 474.3 | 291.0 |
| | 203 | 0.62 | 0.62 | 7.82 × 7.72 × 1.20 | 0 124 | 1.71 | 608.2 | 297.2 |
| | 203 | 0.62 | 0.62 | 8.06 × 7.99 × 1.16 | 0.111 | 1.49 | 449.4 | 301.6 |
| | 203 | 0.62 | 0.62 | 7.84 × 7.83 × 1.20 | 0.120 | 1.63 | 496.9 | 304 8 |
| | 203 | 0.62 | 0.62 | 8.07 × 7.99 × 1.21 | 0.113 | 1.45 | 455.8 | 314.3 |
| | 203 | 0.62 | 0.62 | 8.11 × 7.95 × 1.23 | 0 117 | 1.48 | 496.3 | 335.3 |
| | 203 | 0.62 | 0.62 | 7.917.90 × 1.14 | 0 116 | 1.62 | 646.7 | 337.4 |
| | 203 | 0.62 | 0.62 | 8.03 × 7.96 × 1.20 | 0.112 | 1.46 | 496.7 | 339.2 |

ADVANTAGES AND INDUSTRIAL APPLICABILITY

The embodiments and broader invention described herein provide a number of advantages and have broad industrial applicability.

Firstly, the techniques and materials utilised and developed as part of the embodiments described herein provide for the creation of ceramic objects with programmable and customizable designs.

Secondly, advanced shape-morphing systems, inspired by compressive buckling-induced origami, enable the design of high-resolution complex ceramics are almost impossible to create by any other method due the complexity of the high-resolution complex ceramics.

Moreover, 4D printing of ceramics enable the design higher resolution than 3D printing. Variation of the self-forming method parameters provides high-fidelity in geometrical resolution involved in shape-morphing process, for example, displacement control in the stretch device.

A further advantage is that DIW-heat treatment method is a relatively cost effective compared to other additive manufacturing techniques for ceramics. Once driving factor for the cost effectiveness of the use of the DIW-heat treatment method is that it does not require the use of costly high energy apparatus that are required for other techniques. For example, 3D lithography techniques require an expensive laser or UV energy apparatuses other techniques involving the sintering of ceramic powders require an apparatus that fuses the powders at high temperatures at or above 1600° C. for ceramic powered compounds such as SiC and $Si_3N_4$.

Moreover, shape-morphing capabilities of elastomers improves the adaptability of structural materials to versatile application environments. For example, the embodiments of the present invention provide advantageous applications in space exploration as 3D-printed elastomeric precursors can be folded to save valuable space prior to launch, and then spread into desired structures at a later stage in the journey. After elastomer-to-ceramic transformation, 4D-printed ceramics provide thermal resistant and mechanically robust structures which is particularly useful for space craft on re-entry into an atmosphere.

Additionally, the method described demonstrates a strength-scalability synergy, meaning that the techniques and materials described herein are highly advantageous for application in production on an industrial scale.

Further, the techniques and materials utilised and developed as part of the embodiments are cost effective and enable the fabrication of 4D printed ceramic structures in a cost-efficient manner. For example, for a series of complex-shaped ceramics with similar geometries, the embodiments of the present invention provide a comparatively cost and time effective means of fabricating a series of complex-shaped ceramics with continuously variable geometries that are capable of being derived from a simple design.

Furthermore, all the materials and techniques used in the embodiments are based on commercially available and open-end feedstock systems, which enables the embodiments described herein to have commercial potential and industrial applicability without excessive initial capital expenditure on custom fabrication machinery.

Lastly, in a more general sense, the abovementioned advantages provide enable the materials and techniques of the embodiments to be utilized in many structural applications including autonomous morphing ceramic composites, aerospace propulsion components, and high temperature microelectromechanical systems.

The invention claimed is:

1. A method of constructing a 4D-printed ceramic object, the method comprising the steps of:
   extruding inks including particles and polymeric ceramic precursors through a nozzle to deposit the inks to form a first elastic structure and a second elastic structure, subjecting the first elastic structure to a tensile stress along at least one axis,
   extruding joins to attach the second elastic structure to the first elastic structure,
   releasing the application of the tensile stress from the first elastic structure to allow the first elastic structure and second elastic structure to form a 4D-printed elastomeric object, and converting the 4D-printed elastomeric object into the 4D-printed ceramic object.

2. A method of constructing a 4D-printed ceramic object in accordance with claim 1, wherein the second elastic structure includes at least one area of lower bending stiffness or uniform bending stiffness.

3. A method of constructing a 4D-printed ceramic object in accordance with claim 2, wherein the release of the first elastic structure from the tensile stress further includes the generation of a relative compressive stress to the second elastic structure which deforms the second elastic structure.

4. A method of constructing a 4D-printed ceramic object in accordance with claim 2, wherein the one or more of areas of reduced bending stiffness are arranged in a buckling pattern.

5. A method of constructing a 4D-printed ceramic object in accordance with claim 4, wherein the buckling pattern is arranged in a Miura-ori pattern.

6. A method of constructing a 4D-printed ceramic object in accordance with claim 1, wherein the first elastic structure is a planar substrate.

7. A method of constructing a 4D-printed ceramic object in accordance with claim 1, wherein the tensile stress is provided by attaching the first elastic structure to a stretching means.

8. A method of constructing a 4D-printed ceramic object in accordance with claim 7, wherein the stretching means is a biaxial stretching device.

9. A method of constructing a 4D-printed ceramic object in accordance with claim 1, wherein at least one of the first elastic structure and the second elastic structure have a stretch ratio of 3.

10. A method of constructing a 4D-printed ceramic object in accordance with claim 1, wherein the particles are zirconium dioxide nanoparticles.

11. A method of constructing a 4D-printed ceramic object in accordance with claim 1, wherein the polymeric ceramic precursors are polysiloxanes.

12. A method of constructing a 4D-printed ceramic object in accordance with claim 11, wherein the polysiloxanes is poly(dimethylsiloxane).

13. A method of constructing a 4D-printed ceramic object in accordance with claim 1, wherein the inks are formed from a homogenous distribution of the particles in the polymeric ceramic precursors and wherein the weight percentage of the particles in the inks is in the range of from about 1% to about 90% and the weight percentage of the polymeric ceramic precursors in the inks is in the range of from about 10% to about 99%.

14. A method of constructing a 4D-printed ceramic object in accordance with claim 1, wherein the step of converting the 4D-printed elastomeric object into the 4D-printed ceramic object further includes heat treatment of the 4D-printed elastomeric object in a vacuum or under an inert atmosphere.

15. A method of constructing a 4D-printed ceramic object in accordance with claim 14, wherein the inert atmosphere includes argon.

16. A method of constructing a 4D-printed ceramic object in accordance with claim 14, wherein the heating treatment occurs in a temperature range of 400° C. to 2000° C.

17. A method of constructing a 4D-printed ceramic object in accordance with claim 1, wherein the step of converting the 4D-printed elastomeric object into the 4D-printed ceramic object further includes subjecting the 4D-printed elastomeric object to further heat treatment in air after heat treatment in a vacuum or under an inert atmosphere.

* * * * *